United States Patent
Sung et al.

(10) Patent No.: US 7,861,588 B2
(45) Date of Patent: Jan. 4, 2011

(54) FORCE REBALANCE CONTROL SYSTEM AND METHOD USING AUTOMATIC GAIN CONTROL LOOP

(75) Inventors: Sang-Kyung Sung, Seoul (KR); Woon-Tahk Sung, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 448 days.

(21) Appl. No.: 12/023,684

(22) Filed: Jan. 31, 2008

(65) Prior Publication Data
US 2009/0007662 A1   Jan. 8, 2009

(30) Foreign Application Priority Data
Jul. 6, 2007   (KR) .................... 10-2007-0068207

(51) Int. Cl.
*G01C 19/56*   (2006.01)
(52) U.S. Cl. ................................ 73/504.12; 73/504.04
(58) Field of Classification Search ........... 703/504.02, 703/504.04, 504.12, 504.14, 504.15, 514.32, 703/514.16, 514.17, 514.18, 514.29, 510, 703/511
See application file for complete search history.

(56) References Cited

U.S. PATENT DOCUMENTS

| | | | | | |
|---|---|---|---|---|---|
| 5,481,914 | A | * | 1/1996 | Ward | ........................ 73/504.16 |
| 6,253,612 | B1 | * | 7/2001 | Lemkin et al. | ............ 73/504.02 |
| 6,578,420 | B1 | * | 6/2003 | Hsu | ........................ 73/504.16 |
| 6,848,304 | B2 | * | 2/2005 | Geen | ........................ 73/504.04 |
| 2009/0019933 | A1 | * | 1/2009 | Sung et al. | ............... 73/504.04 |

FOREIGN PATENT DOCUMENTS

KR   1020010026824   4/2001

OTHER PUBLICATIONS

Yen-Cheng Chen, et al., "A Control and Signal Processing Integrated Circuit for the JPL-Boeing Micromachined Gyroscopes," IEEE Transactions on Control Systems Technology, vol. 13, No. 2, Mar. 2005, pp. 286-300.
Robert T. M'Closkey, et al., "Mode Localization Induced by a Nonlinear Control Loop," Nonlinear Dynamics 25: 2001, pp. 221-236.

* cited by examiner

Primary Examiner—Helen C. Kwok
(74) Attorney, Agent, or Firm—H.C. Park & Associates, PLC (57) ABSTRACT

The present invention relates to a force rebalance control system and method using an automatic gain control loop, which are configured to perform the force rebalance feedback control of a vibratory gyroscope using the automatic gain control loop for controlling the velocity signal of a mass body. Accordingly, the present invention is advantageous in that a conventional digital circuit, which is complicated and sensitive to noise, can be implemented using a simple analog circuit, and the present invention can be extended and applied to general- purpose vibratory gyroscopes or various sensor fields, such as those of an inertial sensor, a pressure sensor, and a temperature sensor, as well as micro-gyroscopes. Further, a force rebalance control system using an automatic gain control loop according to the present invention is applied to various sensors, thus improving performance, such as the dynamic range, bandwidth, and linearity of the sensors.

20 Claims, 8 Drawing Sheets

| | |
|---|---|
| pkpk(B) | 1.0312 V |
| meen(B) | 1.05034 V |
| sdev(B) | 376.414 mV |
| mms(B) | 1.88826 V |
| bmpl(B) | 1.003 V |

FORCE REBALANCE CONTROL SYSTEM AND METHOD USING AUTOMATIC GAIN CONTROL LOOP

BACKGROUND OF THE INVENTION

1. Field of the Invention

The present invention relates, in general, to technology for electrical feedback control for improving the sensor performance of typical gyroscopes, and, more particularly, to a system for implementing force rebalance control using an automatic gain control loop suitable for the design of small-sized and low power systems, such as Micro-Electro-Mechanical System (MEMS) gyroscopes.

2. Description of the Related Art

As well known to those skilled in the art, a gyroscope is a measurement sensor for measuring angular velocity, which is an inertial physical quantity existing in a rotating coordinate system, and representative examples thereof include a mechanical gyroscope and an optical gyroscope for detecting the difference between the traveling paths of light in a tachometer.

Small-sized and low power micro-gyroscopes using MEMS technology are currently being manufactured, and various application fields for use of the micro-gyroscopes have been proposed. Such a micro-gyroscope is applied to fields of inertial navigation systems used in airplanes, spacecraft, missiles, submarines, ships, etc., and the application fields thereof have extended to vehicle fields, such as vehicle attitude control, rollover detection, vehicle navigation, accident recording, collision avoidance, load leveling, and suspension control, consumer electronics fields, such as computer input devices, game controllers, virtual reality input tools, sports utility sensors, camcorders, and household robots, industrial electronics fields, such as self-controlled traveling, guide robots, oil hydraulic equipment, and attitude control, and small-sized flying object system fields, such as aerial electronics, antenna direction angle control, unmanned aerial vehicles, and light aircraft automatic landing devices. Recently, a rate-grade or tactical-grade gyroscope for angular velocity measurement used in typical control has been manufactured in the form of a micro-gyroscope using a semiconductor manufacturing process. Such a gyroscope having a micro-gyroscope form has characteristics such as small size, low power consumption, and mass production due to the manufacturing process thereof.

A vibratory gyroscope is characterized in that it employs a scheme for detecting Coriolis force applied to a mass body that vibrates in a plane perpendicular to an angular velocity input axis in a rotating coordinate system. In this case, the gyroscope can calculate the magnitude of an input angular velocity proportional to the Coriolis force by detecting a displacement signal induced by the Coriolis force.

Figure 1:
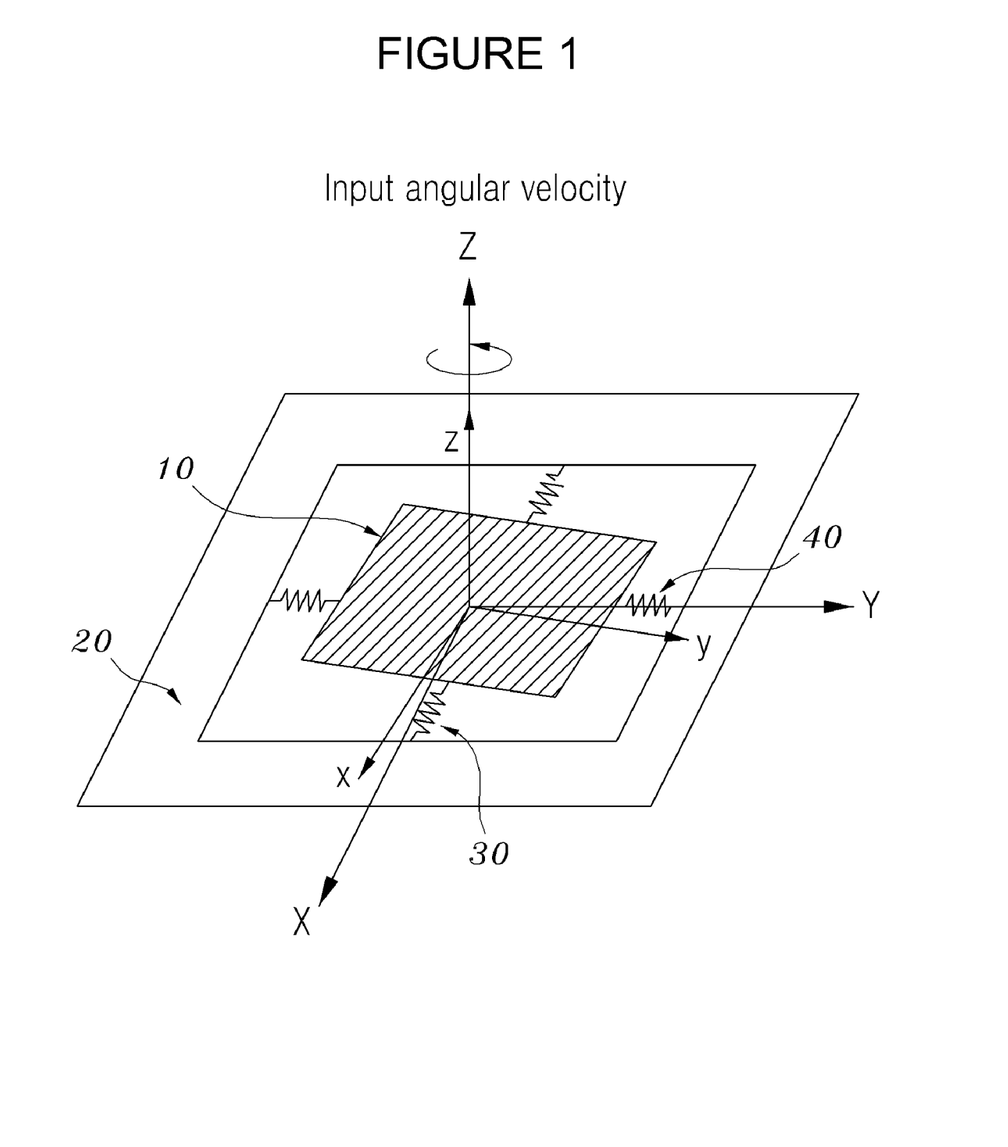
FIG. 1 is a FIG. 1 is a diagram showing an example of the operating principles of a typical gyroscope.

FIG. 1 is a diagram showing an example of the operating principles of a typical gyroscope. As shown in the drawing, a mass body 10 vibrates according to dynamics in an X axis direction, causes Coriolis force, which is twice the angular velocity of the mass body, depending on an input angular velocity applied along a Z axis, and detects a displacement signal along a Y-axis, thus calculating the input angular velocity. In this case, the vibration amplitudes of driving displacement and detection displacement are determined using the modulus of elasticity of a driving axis spring 30 and a sensing axis spring 40, which support the mass body between the mass body and the framework 20 of the gyroscope.

Meanwhile, in the operating principles of the gyroscope, an open-loop detection method is disadvantageous in that the dynamic range of a sensor may be limited, non-linearity between input and output may be amplified, and bandwidth is greatly limited in an environment such as a vacuum, in which high frequency selectivity is required, but such a disadvantage can be overcome by applying a closed-loop type force rebalance control method of maintaining the displacement signal of a sensor in a uniformly balanced state.

The above-described closed loop-type force rebalance control realizes the force rebalance control of a gyroscope by utilizing a complicated robust control or adaptive control algorithm.

However, this is problematic in that, since complicated peripheral circuits, such as a microprocessor, are required, it is difficult to efficiently manufacture small-sized and low-priced sensors, and in that, since a method of completely suppressing the displacement signal of a detection axis caused by an input angular velocity is adopted, a very high control gain is required, thus making it difficult to implement circuits, or causing errors in force rebalance control.

SUMMARY OF THE INVENTION

Accordingly, the present invention has been made keeping in mind the above problems, and an object of the present invention is to provide a system and method for performing the force rebalance feedback control of a vibratory gyroscope by utilizing an automatic gain control loop that controls the velocity signal of a mass body.

In order to accomplish the above object, the present invention provides a force rebalance control system using an automatic gain control loop, comprising a gyroscope for detecting a displacement signal of a mass body corresponding to an input angular velocity, and adjusting a displacement of the mass body; a charge amplifier for converting the displacement signal detected by the gyroscope into a voltage signal, and outputting the voltage signal; a differentiator for outputting a velocity signal of the mass body on a basis of the displacement signal, output from the charge amplifier as the voltage signal; a unity gain reference frequency output unit for outputting a sine wave signal having a phase, frequency, and unity gain identical to those of the velocity signal output from the differentiator; a reference value input unit for generating a reference signal required to induce vibration of a sensing axis having uniform intensity regardless of the angular velocity applied to the gyroscope; a controller for outputting a control signal, required for the gyroscope to vibrate with a predetermined amplitude, using the reference signal output from the reference value input unit; and a multiplier for performing a multiplication operation on the sine wave signal, output from the unity gain reference frequency output unit, and the control signal, output from the controller, and applying a resulting voltage signal to the gyroscope.

Preferably, the gyroscope may comprise a sensing axis output unit for detecting the displacement signal of the mass body corresponding to the input angular velocity; and a sensing axis driving unit for adjusting the displacement of the mass body.

Preferably, the unity gain reference frequency output unit may comprise a gain unit for amplifying an input signal by a high gain factor; a limiter for outputting a square wave signal having a same phase as the input signal; and a band pass filter having a center frequency corresponding to a resonant frequency of the gyroscope.

Preferably, the force balance control system may further comprise a rectifier for half-wave rectifying the velocity signal output from the differentiator; and a low pass filter for outputting a signal half-wave rectified by the rectifier as an envelope signal.

Preferably, the controller may comprise an integral unit for performing an integration operation on the difference value between the envelope signal, output from the low pass filter, and the reference signal, generated by the reference value input unit; a proportional gain unit for multiplying a gain value by the difference value; and an integral gain unit for multiplying a gain value by the result of integration output from the integral unit.

In addition, the present invention provides a force rebalance control method using an automatic gain control loop, comprising a first step of detecting a fine displacement of a sensing axis provided in a gyroscope; a second step of generating a velocity signal of a mass body on a basis of a displacement signal corresponding to the detected fine displacement; a third step of generating a sine wave signal having a phase, frequency, and unity gain identical to those of the velocity signal, and a control signal required for the gyroscope to vibrate with a predetermined amplitude; a fourth step of performing a multiplication operation on the sine wave signal and the control signal, thus generating an amplitude-modulated signal; and a fifth step of applying the amplitude-modulated signal to the gyroscope so as to maintain the displacement of the mass body at a uniform value.

Preferably, the first to fifth steps may be repeated when an angular velocity is input to the gyroscope after the fifth step.

Preferably, the force rebalance control method may further comprise the step of adjusting a resonant frequency to cause the sensing axis and a driving axis of the gyroscope to have a same resonant frequency when the sensing axis and the driving axis of the gyroscope do not have the same resonant frequency before the first step.

Preferably, the third step of generating the control signal comprises a first sub-step of detecting a high frequency envelope signal from the velocity signal; a second sub-step of generating a reference signal required to induce vibration of the sensing axis having uniform intensity regardless of the angular velocity applied to the gyroscope; and a third sub-step of generating a control signal required for the gyroscope to vibrate with a predetermined amplitude using both the envelope signal, detected at the first sub-step, and the reference signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The above and other objects, features and other advantages of the present invention will be more clearly understood from the following detailed description taken in conjunction with the accompanying drawings. Before the description of the present invention, it should be noted that the terms or words used in the present specification and claims are to be interpreted as having meanings and concepts corresponding to the technical spirit of the present invention on the basis of the principle by which the inventor can suitably define the concept of terms to describe the invention in the best way. Further, it should be noted that detailed descriptions of related well-known functions and constructions may be omitted if it is determined that such descriptions would make the gist of the present invention unclear.

Hereinafter, embodiments of the present invention will be described in detail with reference to the attached drawings.

Figure 2:
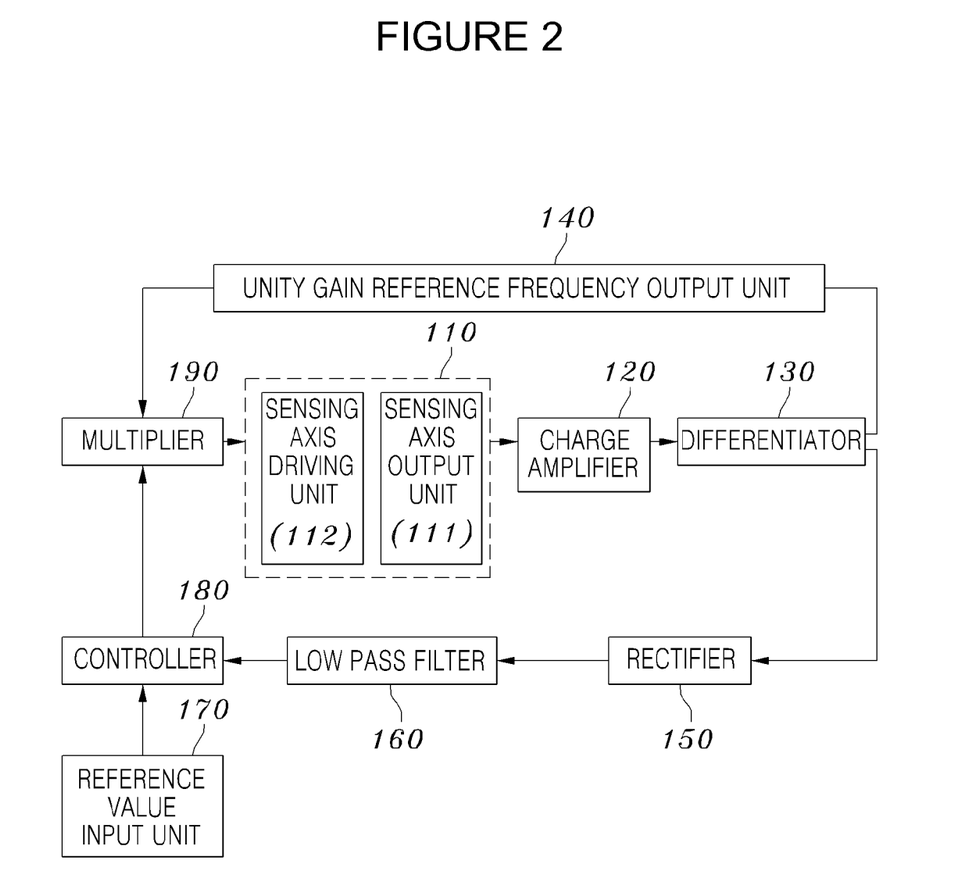
FIG. 2 is a diagram showing the construction of a force rebalance control system using an automatic gain control loop according to the present invention.

FIG. 2 is a diagram conceptually showing a force rebalance control system 100 (hereinafter referred to as a 'force rebalance system') using an automatic gain control loop according to the present invention. As shown in the drawing, the force rebalance system 100 includes a gyroscope 110, a charge amplifier 120, a differentiator 130, a unity gain reference frequency output unit 140, a rectifier 150, a low pass filter 160, a reference value input unit 170, a controller 180, and a multiplier 190.

The gyroscope 110 includes a sensing axis output unit 111 for detecting the displacement signal of a mass body corresponding to an input angular velocity, and a sensing axis driving unit 112 for adjusting the displacement signal of the mass body on the basis of a gyroscope control signal calculated by the multiplier.

The charge amplifier 120 functions to output the displacement signal, detected by the sensing axis output unit 111 as a voltage signal.

In detail, the charge amplifier 120 is connected to the sensing axis output unit 111 and is configured to convert variation in the amount of charge corresponding to variation in the capacitance between the mass body and the electrode of the sensing axis output unit into a voltage signal and to output the voltage signal. Therefore, the voltage signal output from the charge amplifier 120 is detected as a function of the displacement signal proportional to the input angular velocity.

The differentiator 130 functions to output the velocity signal of the mass body by differentiating the displacement signal, output from the charge amplifier 120, as the voltage signal. In this case, the velocity signal of the mass body, output from the differentiator 130, is applied to two independent feedback loops, that is, the unity gain reference frequency output unit 140 and the rectifier 150.

Figure 3:
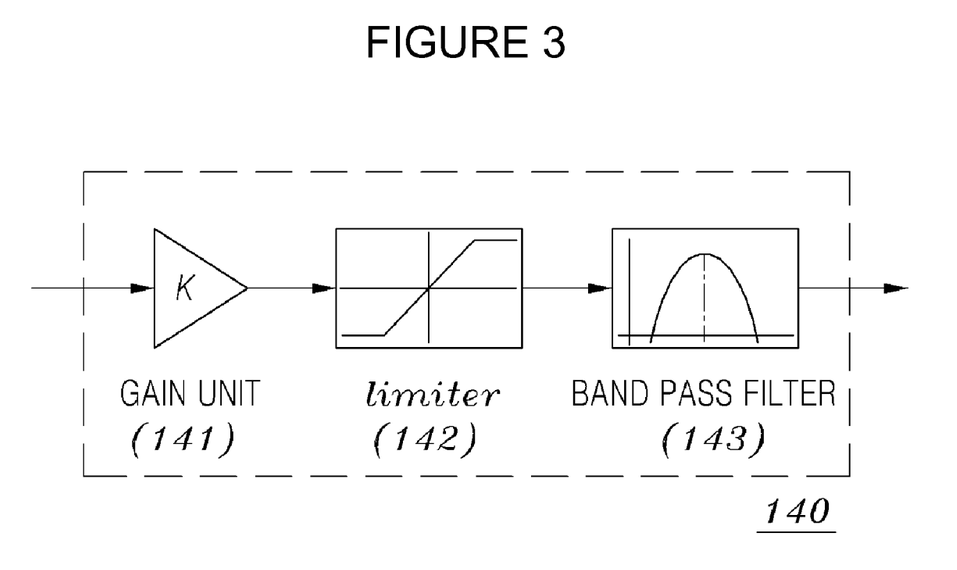
FIG. 3 is a diagram showing the detailed construction of a unity gain reference frequency output unit according to the present invention.

First, the unity gain reference frequency output unit 140 functions to output a sine wave signal having a frequency, a phase and a unity gain identical to those of the velocity signal output from the differentiator 130. As shown in FIG. 3, the unity gain reference output unit includes a gain unit 141 implemented with an amplifier, which uses an Operational Amplifier (OP-Amp), and configured to amplify an input signal by a high gain factor, a limiter 142 for outputting a square wave signal having the same phase as the input signal, and a band pass filter 143, having a center frequency corresponding to the resonant frequency of the gyroscope.

That is, the unity gain reference frequency output unit 140 can also generate a square wave having the same resonant frequency as the velocity signal of the mass body, having a relatively low Signal to Noise Ratio (SNR). In the present invention, the limiter 142 is set to a comparator that exploits an OP-Amp having a suitable slew rate, but is not limited to this comparator, and can be variously set to a Schmitt trigger or the like according to the intensity of a noise signal.

Further, the rectifier 150 functions to half-wave rectify the velocity signal output from the differentiator 130, and the low pass filter 160 functions to output the signal, half-wave rectified by the rectifier 150, as an envelope signal.

The reference value input unit 170 functions to generate a reference signal for inducing the vibration of a sensing axis having uniform intensity, regardless of the angular velocity applied to the gyroscope. The controller 180 functions to output a control signal, required for the gyroscope to vibrate with a predetermined amplitude, using both the envelope signal output from the low pass filter 160 and the reference signal generated by the reference value input unit 170.

Figure 4:
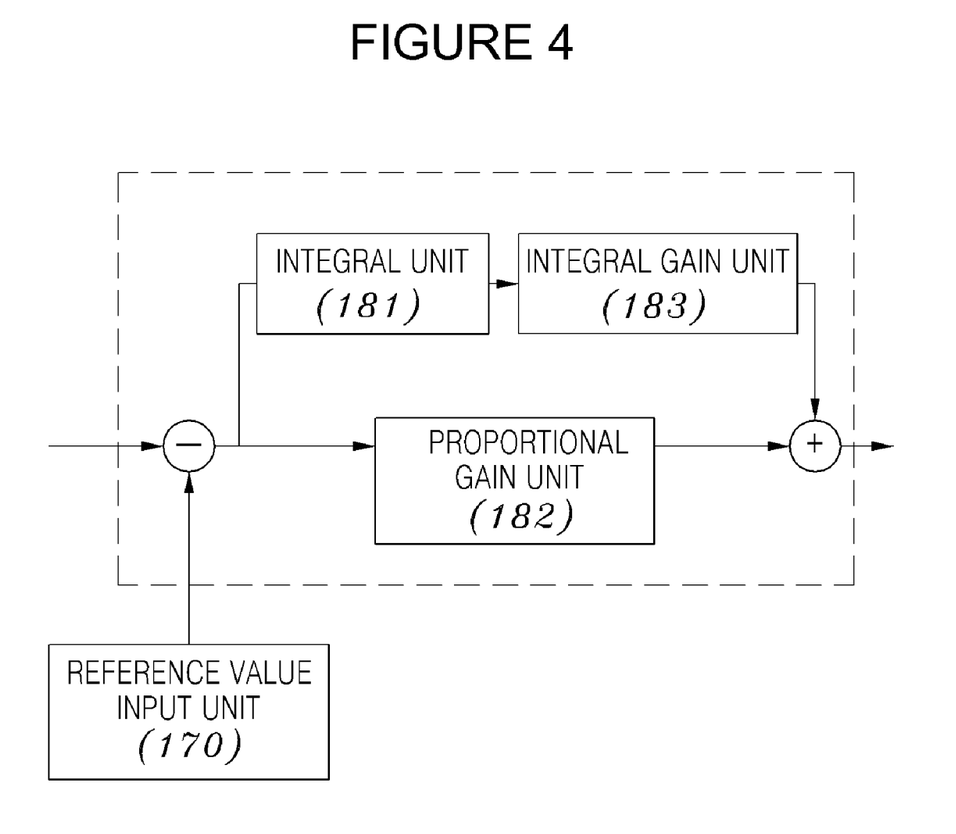
FIG. 4 is a diagram showing the detailed construction of a controller according to the present invention.

FIG. 4 is a diagram conceptually showing the controller 180. As shown in the drawing, the controller 180 includes an integral unit 181 for performing an integration operation on the difference value between the envelope signal, output from the low pass filter 160, and the reference signal, generated by the reference value input unit 170, and a proportional gain unit 182 and an integral gain unit 183 for multiplying respective gain values by the difference value and the result of integration.

That is, the voltage value, obtained by multiplying a proportional gain by the difference between the envelope signal output from the low pass filter 160 and the reference signal, generated by the reference value input unit 170, is added to the voltage value, obtained by multiplying an integral gain by the result of integration.

The multiplier 190 performs a multiplication operation on the sine wave signal, output from the unity gain reference frequency output unit 140, and the control signal, output from the controller 180, and applies the resulting voltage signal to the sensing axis driving unit 111 of the gyroscope 110.

In summary, the voltage signal applied to the sensing axis driving unit is used to perform force rebalance feedback control to maintain the vibration amplitude of the mass body, varying with Coriolis force, at a uniform value.

Figure 5:
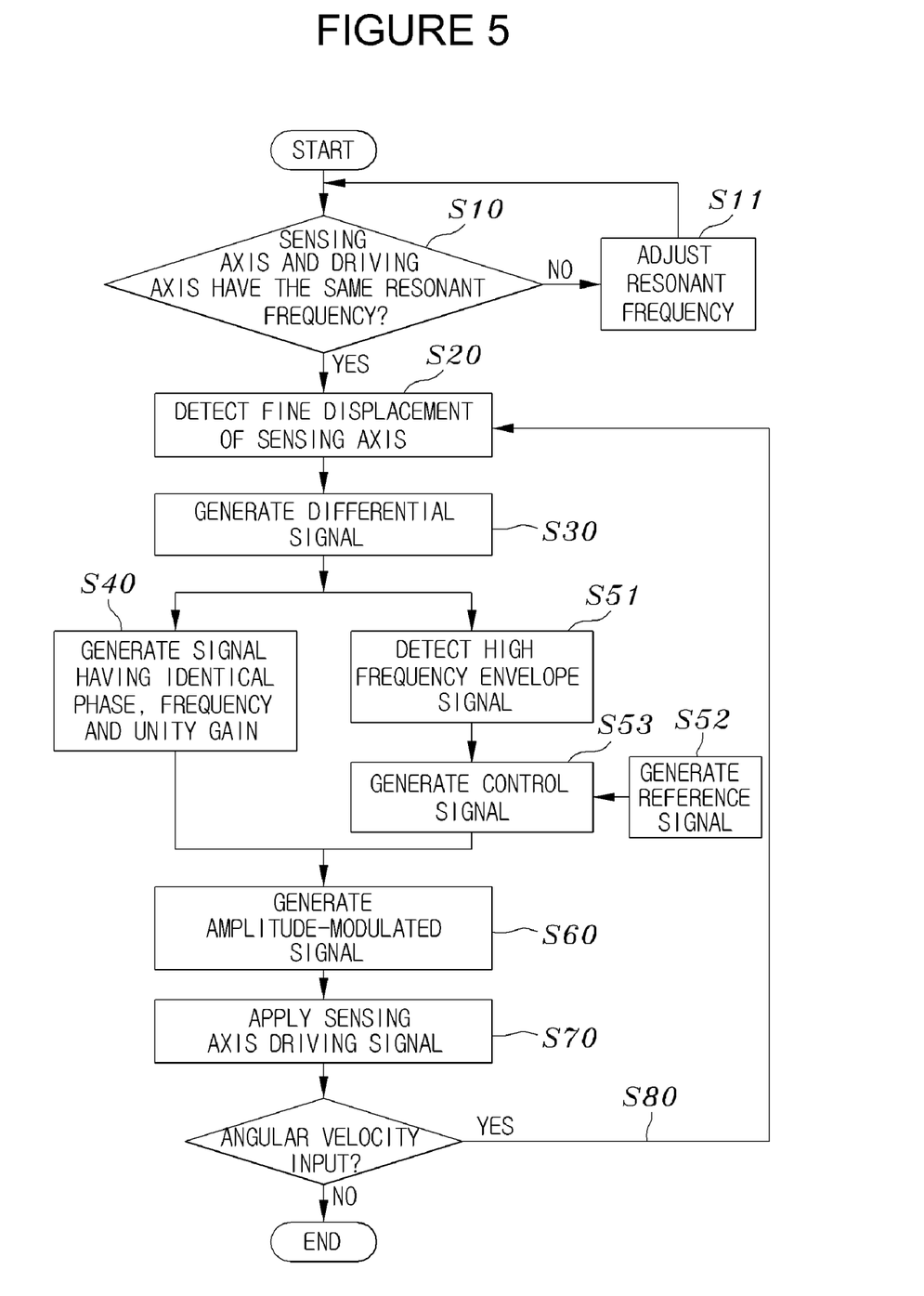
FIG. 5 is a flowchart showing the operation of a force rebalance control system using an automatic gain control loop and the force rebalance control method according to the present invention.

Hereinafter, the operation of a force rebalance control system using an automatic gain control loop and a force rebalance control method using an automatic gain control loop according to the present invention are described with reference to FIG. 5.

First, when the sensing axis and the driving axis of the gyroscope do not have the same resonant frequency, a pre-processing procedure for adjusting a resonant frequency to thus cause the sensing and driving axes to have the same resonant frequency is performed at steps S10 and S11.

Next, when angular velocity is input to the gyroscope, the fine displacement of the sensing axis provided in the gyroscope is detected at step S20.

When the fine displacement is detected, the velocity signal of the mass body is generated on the basis of the displacement signal corresponding to the detected fine displacement at step S30.

This velocity signal is a differential signal obtained by differentiating the displacement signal.

Next, the step S40 of generating a sine wave signal, having a phase, a frequency and a unity gain identical to those of the velocity signal, and the steps S51, S52 and S53 of generating the control signal, required for the gyroscope to vibrate with predetermined amplitude, are performed.

In this case, the step of generating the control signal required for the gyroscope to vibrate with the predetermined amplitude is described in detail. First, a high frequency envelope signal is detected from the velocity signal at step S51. Further, a reference signal for inducing the vibration of the sensing axis, having uniform intensity, regardless of the angular velocity applied to the gyroscope, is generated simultaneously with the detection of the envelope signal at step S52.

Next, the control signal, required for the gyroscope to vibrate with uniform amplitude, is generated using both the detected envelope signal and the reference signal at step S53.

The generation of the control signal using the two signals is described in detail. First, the difference value between the envelope signal and the reference signal is obtained.

Next, the step of performing an integration operation on the difference value and multiplying a predetermined gain value by the result of integration and the step of multiplying a predetermined gain value by the difference value without performing an integration operation are simultaneously performed.

The two resulting values, obtained in this way, are added to each other, and thus the control signal is generated.

Next, a multiplication operation is performed on a sine wave signal, having a phase, a frequency and a unity gain identical to those of the velocity signal, and the control signal, and thus an amplitude-modulated signal is generated at step S60.

When the amplitude-modulated signal is generated, it is applied to the sensing axis driving unit 111 of the gyroscope 110 in order to maintain the displacement of the varying mass body at a uniform value at step S70.

The voltage signal applied to the sensing axis driving unit in this way is used to perform force rebalance feedback control for maintaining the vibration amplitude of the mass body, which varies with the Coriolis force at a uniform value.

Thereafter, when angular velocity is input to the gyroscope, a procedure starting from the step of detecting the fine displacement of the sensing axis provided in the gyroscope is performed at step S80.

Figure 6:
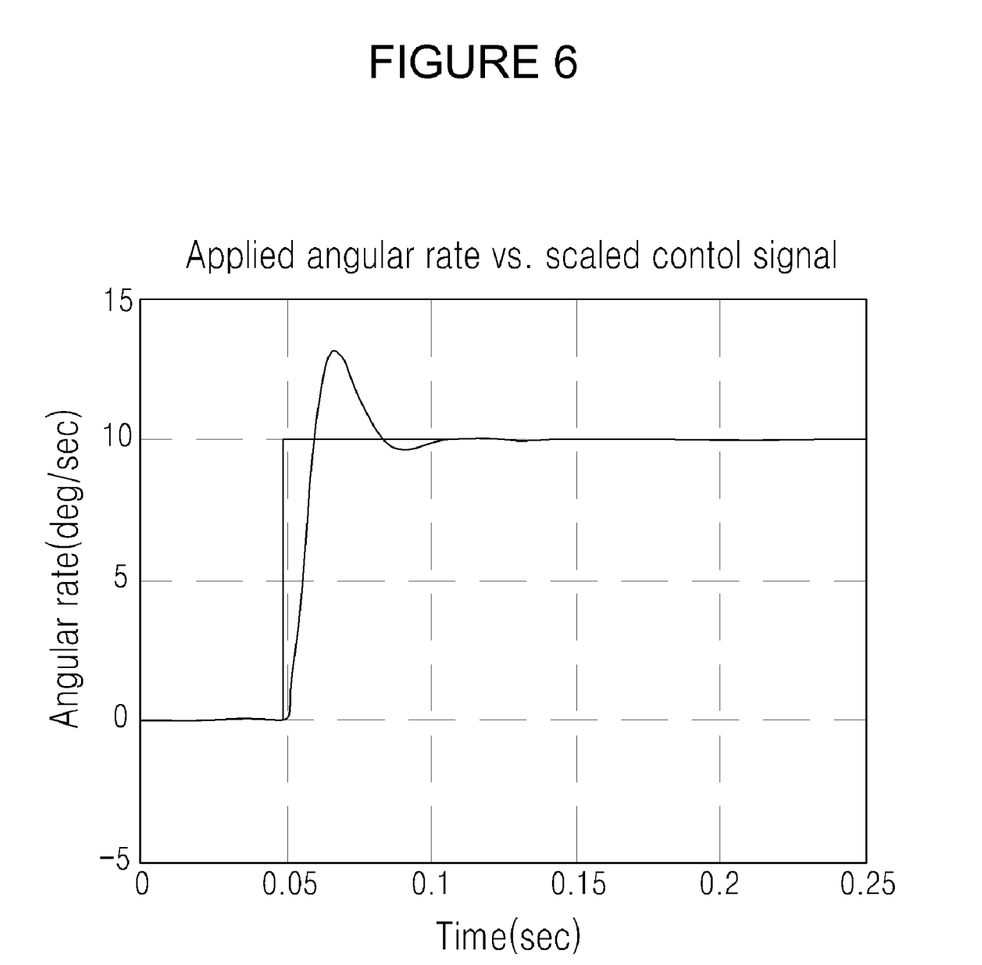
FIG. 6 is a graph showing an input angular velocity versus control signal in a force rebalance control system using an automatic gain control loop according to the present invention.

Meanwhile, FIG. 6 is a graph showing an input angular velocity versus control signal (vibration signal) in the force rebalance control system according to the present invention. As shown in the drawing, it can be seen that, when an angular velocity of 10 deg/sec is input at 0.05 seconds, the control signal, output from the controller, follows the input angular velocity signal, with a rising time of 10 msec.

Figure 7:
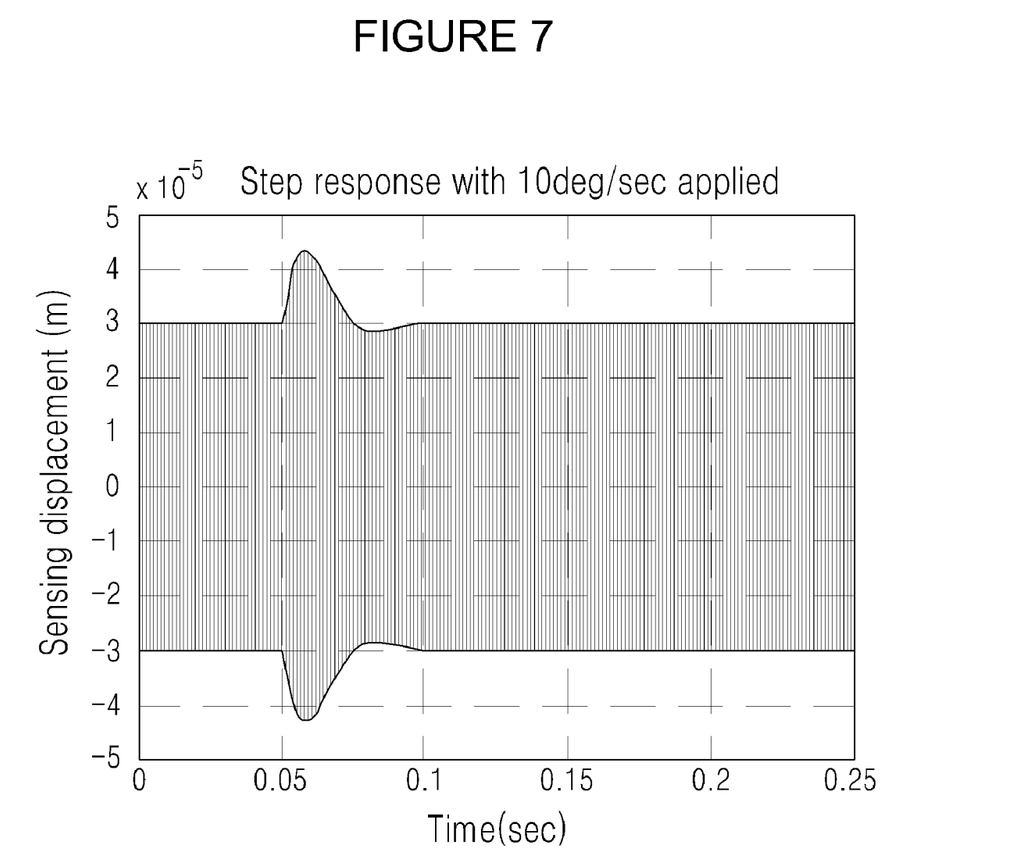
FIG. 7 is a graph showing an input angular velocity versus angular velocity in a force rebalance control system using an automatic gain control loop according to the present invention.

FIG. 7 is a graph showing an input angular velocity versus angular velocity signal (displacement signal) in the force rebalance control system according to the present invention. As shown in the drawing, it can be seen that, when an angular velocity of 10 deg/sec is input at 0.05 seconds, the same amplitude is maintained. A velocity, at which the angular velocity signal reaches a steady state within about 20 msec, is illustrated.

Figure 8:
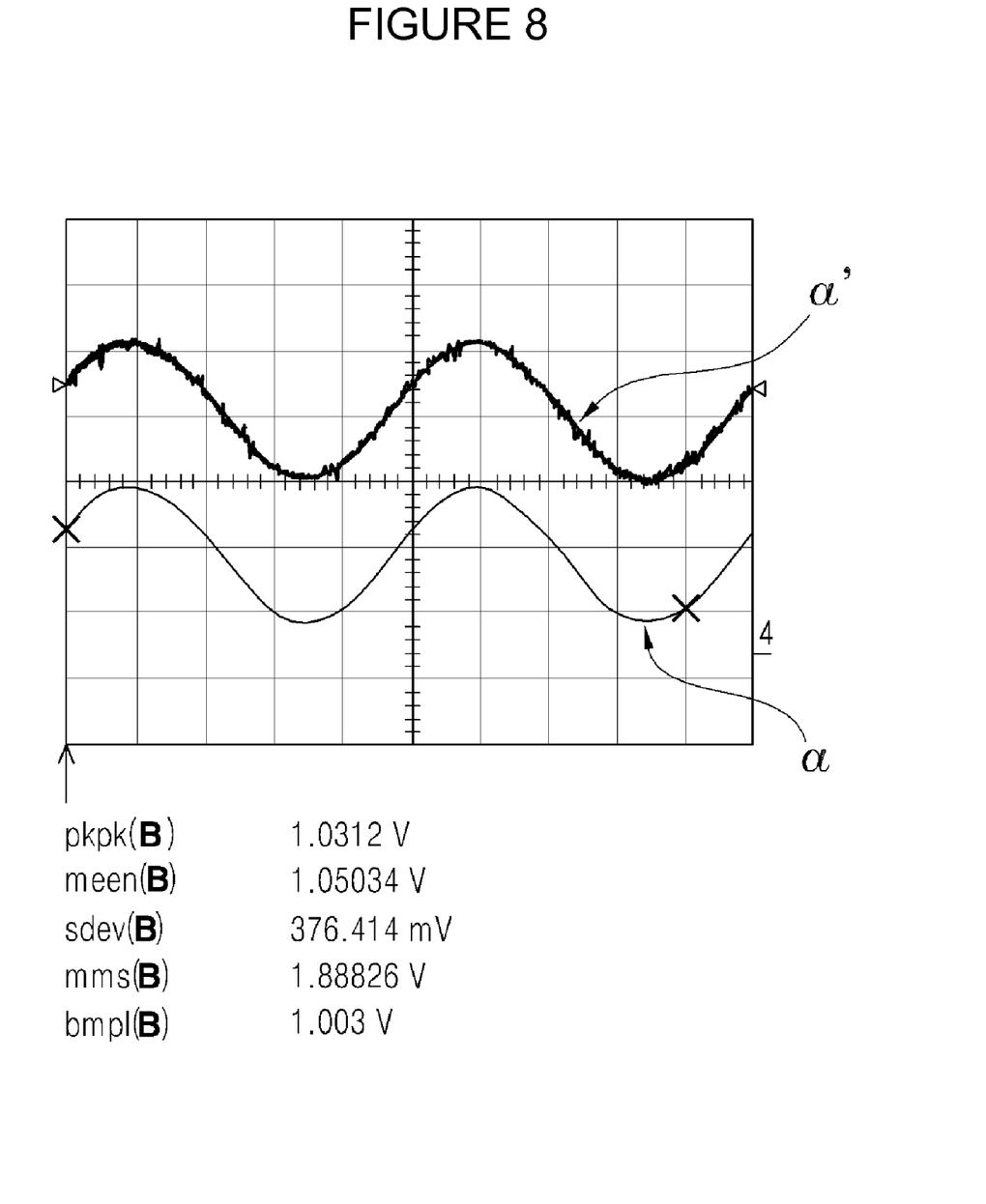
FIG. 8 is a graph showing the input signal and the output signal of angular velocity using a gyroscope applied to a force rebalance control system using an automatic gain control loop according to the present invention.

FIG. 8 is a graph showing the input signal and output signal of angular velocity using a gyroscope applied to the force rebalance control system according to the present invention, in which "a" denotes an input sinusoidal angular velocity signal of about 100 deg/sec at 1 Hz, and "a'" denotes an output signal corresponding to the input signal and shows that the same waveform is output even for the input angular velocity, without causing distortion.

According to the present invention, a conventional digital circuit, which is complicated and sensitive to noise, can be implemented using a simple analog circuit, so that the present invention can be extended and applied to general-purpose vibratory gyroscopes or various sensor fields, such as those of an inertial sensor, a pressure sensor, and a temperature sensor, as well as micro-gyroscopes.

Further, a force rebalance control system using an automatic gain control loop according to the present invention is applied to various sensors, thus improving performance, such as the dynamic range, bandwidth, and linearity of the sensors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A force rebalance control system using an automatic gain control loop, comprising:
    a gyroscope to detect a displacement signal of a mass body corresponding to an input angular velocity, and to adjust a displacement of the mass body;
    a charge amplifier to convert the displacement signal detected by the gyroscope into a voltage signal, and to output the voltage signal;
    a differentiator to output a velocity signal of the mass body on a basis of the displacement signal, output from the charge amplifier as the voltage signal;
    a unity gain reference frequency output unit to output a sine wave signal having a phase, frequency, and unity gain identical to a phase and frequency of the velocity signal output from the differentiator;
    a reference value input unit to generate a reference signal required to induce vibration of a sensing axis having uniform intensity regardless of the input angular velocity;
    a controller to output a control signal, required for the gyroscope to vibrate with a predetermined amplitude, using the reference signal output from the reference value input unit; and
    a multiplier to perform a multiplication operation on the sine wave signal, output from the unity gain reference frequency output unit, and the control signal, output from the controller, and to output a resulting voltage signal and apply the resulting voltage signal to the gyroscope.

2. The force rebalance control system according to claim 1, wherein the gyroscope comprises:
    a sensing axis output unit to detect the displacement signal of the mass body corresponding to the input angular velocity; and
    a sensing axis driving unit to adjust the displacement of the mass body.

3. The force rebalance control system according to claim 2, wherein the charge amplifier is connected to the sensing axis output unit and is configured to convert variation in an amount of charge corresponding to variation in capacitance between the mass body and an electrode of the sensing axis output unit into a voltage signal, and to output the voltage signal.

4. The force rebalance control system according to claim 2, wherein the resulting voltage signal, output from the multiplier, is applied to the sensing axis driving unit.

5. The force rebalance control system according to claim 1, wherein the sine wave signal, output from the unity gain reference frequency output unit, is fed back into the multiplier.

6. The force balance control system according to claim 1, wherein the unity gain reference frequency output unit comprises:
    a gain unit to amplify an input signal by a high gain factor;
    a limiter to output a square wave signal having a same phase as the input signal; and
    a band pass filter having a center frequency corresponding to a resonant frequency of the gyroscope.

7. The force balance control system according to claim 6, wherein the gain unit is implemented with an amplifier, which uses an Operational Amplifier (OP-Amp).

8. The force balance control system according to claim 6, wherein the limiter is implemented using a comparator that exploits an OP-Amp.

9. The force balance control system according to claim 1, further comprising:
    a rectifier to half-wave rectify the velocity signal output from the differentiator; and
    a low pass filter to output a signal half-wave rectified by the rectifier as an envelope signal.

10. The force rebalance control system according to claim 9, wherein the envelope signal output from the low pass filter is fed back into the controller.

11. The force rebalance control system according to claim 10, wherein the controller outputs the control signal required for the gyroscope to vibrate with the predetermined amplitude using both the envelope signal output from the low pass filter and the reference signal output from the reference value input unit.

12. The force rebalance control system according to claim 9, wherein the velocity signal output from the differentiator is applied both to the unity gain reference frequency output unit and to the rectifier.

13. The force rebalance control system according to claim 9, wherein the controller adds a value, obtained by multiplying a proportional value by a difference value between the envelope signal, output from the low pass filter, and the reference signal, generated by the reference value input unit, to a value, obtained by integrating the difference value and multiplying an integral gain by a result of integration, and then outputs a resulting value.

14. The force rebalance control system according to claim 13, wherein the controller comprises:
    an integral unit to perform an integration operation on the difference value between the envelope signal, output from the low pass filter, and the reference signal, generated by the reference value input unit;
    a proportional gain unit to multiply a gain value by the difference value; and
    an integral gain unit to multiply a gain value by the result of integration output from the integral unit.

15. A force rebalance control method using an automatic gain control loop, comprising:
    a first step of detecting a fine displacement of a sensing axis provided in a gyroscope due to a displacement of a mass body;

a second step of generating a velocity signal of the mass body on a basis of a displacement signal corresponding to the detected fine displacement;

a third step of generating a sine wave signal having a phase, frequency, and unity gain identical to a phase and frequency of the velocity signal, and a control signal required for the gyroscope to vibrate with a predetermined amplitude;

a fourth step of performing a multiplication operation on the sine wave signal and the control signal, thus generating an amplitude-modulated signal; and a fifth step of applying the amplitude-modulated signal to the gyroscope so as to maintain the displacement of the mass body at a uniform value.

16. The force rebalance control method according to claim 15, wherein the first to fifth steps are repeated when an angular velocity is input to the gyroscope after the fifth step.

17. The force rebalance control method according to claim 15, wherein the first step comprises adjusting a resonant frequency to cause the sensing axis and a driving axis of the gyroscope to have a same resonant frequency when the sensing axis and the driving axis of the gyroscope do not have the same resonant frequency before the detecting the fine displacement of the sensing axis.

18. The force rebalance control method according to claim 15, wherein the velocity signal is a signal obtained by differentiating the displacement signal.

19. The force rebalance control method according to claim 15, wherein the third step of generating the control signal comprises:

a first sub-step of detecting a high frequency envelope signal from the velocity signal;

a second sub-step of generating a reference signal required to induce vibration of the sensing axis having uniform intensity regardless of an angular velocity applied to the gyroscope; and a third sub-step of generating a control signal required for the gyroscope to vibrate with a predetermined amplitude using both the envelope signal, detected at the first sub-step, and the reference signal.

20. The force rebalance control method according to claim 19, wherein the third sub-step comprises:

an integral gain step of performing an integration operation on a difference value between the envelope signal and the reference signal, and multiplying a predetermined gain value by a result of integration; and a proportional gain step of multiplying a predetermined gain value by the difference value between the envelope signal and the reference signal.

* * * * *